US012509929B2

(12) United States Patent

Hei et al.

(10) Patent No.: US 12,509,929 B2
(45) Date of Patent: Dec. 30, 2025

(54) TWO-STAGE FORCE HINGE

(71) Applicant: Hainan Kubo Hardware Products Co., Ltd., Haikou (CN)

(72) Inventors: Xuezhi Hei, Haikou (CN); Wang Xing, Hainan (CN)

(73) Assignee: Hainan Kubo Hardware Products Co., Ltd., Haikou (CN)

( * ) Notice: Subject to any disclaimer, the term of this patent is extended or adjusted under 35 U.S.C. 154(b) by 84 days.

(21) Appl. No.: 18/535,475

(22) Filed: Dec. 11, 2023

(65) Prior Publication Data

US 2024/0110417 A1 Apr. 4, 2024

(51) Int. Cl.
*E05F 1/08* (2006.01)
*E05D 3/12* (2006.01)
*E05D 11/00* (2006.01)

(52) U.S. Cl.
CPC ................ *E05D 3/12* (2013.01); *E05D 11/00* (2013.01)

(58) Field of Classification Search
CPC ........... E05Y 2900/20; E05Y 2900/202; E05Y 2900/204; E05Y 2900/208; E05Y 2201/20; E05Y 2201/21; E05Y 2201/261; E05F 5/006; E05F 5/02; E05F 5/027; E05D 11/00; E05D 11/1021; E05D 11/1042; E05D 11/105; E05D 11/1064; E05D 7/04; E05D 7/0407; E05D 7/125; E05D 3/12; E05D 3/142; E05D 16/286
See application file for complete search history.

(56) References Cited

U.S. PATENT DOCUMENTS

| | | | | |
|---|---|---|---|---|
| 6,684,453 B2 * | 2/2004 | Wang | E05F 5/006 16/49 |
| 8,601,644 B1 * | 12/2013 | Chen | E05F 5/02 16/286 |
| 8,650,711 B1 * | 2/2014 | Chen | E05F 5/006 16/296 |
| 2013/0239363 A1 * | 9/2013 | Capur | E05F 5/006 16/50 |
| 2017/0152693 A1 * | 6/2017 | Chen | E05F 5/006 |
| 2017/0152694 A1 * | 6/2017 | Chen | E05F 5/006 |
| 2017/0218675 A1 * | 8/2017 | Cooper | E05D 3/142 |
| 2018/0155974 A1 * | 6/2018 | Kirenci | E05F 5/02 |
| 2021/0148151 A1 * | 5/2021 | Weber | E05F 5/02 |
| 2021/0404231 A1 | 12/2021 | Menear et al. | |

(Continued)

FOREIGN PATENT DOCUMENTS

| | | |
|---|---|---|
| CN | 110541639 A | 12/2019 |
| CN | 215169036 U * | 12/2021 |

*Primary Examiner* — Chuck Y Mah

(57) ABSTRACT

A novel two-stage force hinge, including a hinge arm, a damping assembly, an adjusting unit for changing a telescopic stroke of the damping assembly is pivotally connected to the hinge arm and can rotate relative to the hinge arm, and a hinge cup pivotally connected to the hinge arm, wherein the damping assembly includes a damping holder, a damping sleeve and a linear damper, the hinge arm is provided with a support unit which is in a jacking fit with the damping holder, and the support unit is used to provide the damping holder and the adjusting unit with a support force along the rotating axial direction of the adjusting unit, effectively mitigating the risk that the adjusting unit caves in and falls out, ensuring that one can screw and adjust the adjusting unit properly with better reliability and stability.

8 Claims, 3 Drawing Sheets

(56) References Cited

U.S. PATENT DOCUMENTS

| | | | | |
|---|---|---|---|---|
| 2022/0081948 | A1 | 3/2022 | Xue et al. | |
| 2022/0090424 | A1 | 3/2022 | Ferrari et al. | |
| 2024/0068291 | A1* | 2/2024 | Capur | E05F 5/006 |

* cited by examiner

TWO-STAGE FORCE HINGE

TECHNICAL FIELD

The present invention relates to the technical field of hinges and in particular to a novel two-stage force hinge.

BACKGROUND

Hinges are widely used in the field of furniture. There are many types of hinges, including one-stage force hinge, two-stage force hinge and three-stage force hinge. They are actually used in numerous scenarios and mounted differently to meet various demands for slowing down. However, existing hinge products have a certain limitation that they cannot be effectively adjusted according to the actual situation, making it difficult to put them into general use. To solve the above-mentioned problem, the applicant proposes a damping-adjustable two-stage force hinge, as described in Chinese patent CN110541639A, which specifically relates to changing the telescopic stroke of a damping assembly by screwing an adjusting unit, so that the hinge has different buffering angles during a close action.

However, the adjusting unit is now generally screwed by inserting and pressing a screwdriver into the cross recess at one end surface of the adjusting unit. If a user at this moment poses a relatively large pressure on the adjusting unit, this may cause the adjusting unit to press against a damping holder. Consequently, the adjusting unit might sink and even cave in and fall out unexpectedly, making it impossible to change the telescopic stroke of the damping assembly any more and turning the hinge into a junk.

SUMMARY

In view of the deficiency in the prior art, the objective of the present invention is to provide a novel two-stage force hinge that is stable and reliable.

To achieve the above-mentioned objective, a solution provided in the present invention is a novel two-stage force hinge, including: a hinge arm; a damping assembly; and an adjusting unit for changing a telescopic stroke of the damping assembly is pivotally connected to the hinge arm and can rotate relative to the hinge arm, and a hinge cup pivotally connected to the hinge arm, wherein the damping assembly includes a damping holder, a damping sleeve directionally and slidably connected to the damping holder, and a linear damper that is set in the damping holder, the telescopic end of the linear damper faces the damping sleeve and the telescopic end is in a jacking contact with inner wall of the tail of the inner cavity of the damping sleeve; and the hinge arm is provided with a support unit which is in a jacking fit with the damping holder, and the support unit is used to provide the damping holder and the adjusting unit with a support force along the rotating axial direction of the adjusting unit.

Further, the support unit is a support shaft fixed at both ends to the hinge arm, and the support shaft extends through a support groove preset on the damping holder.

Further, an opening of the inner cavity of the damping holder extending to the front end thereof also serves as a support groove, and the damping sleeve is formed with a step part at a position close to the opening of the damping holder so as to avoid the support shaft.

Further, the top surface of the damping sleeve is provided with an adjusting tab that stops against an eccentric part preformed on the adjusting unit, wherein the adjusting unit is screwed so as to cause the outer contour of the eccentric part to stop against the adjusting tab at different positions, thereby changing the telescopic stroke of the damping assembly.

Further, the bottom surface of the eccentric part abuts against the damping holder.

Further, also included are an inner rocker pivotally connected to the front end of the hinge arm via a second rotary shaft and a first torsion spring sheathed on a first rotary shaft provided at the front end of the hinge arm.

Further, two inner side walls of the hinge arm are symmetrically formed with a positioning block that is in a jacking contact with the front end of the damping holder, and the damping holder rests against the second rotary shaft, wherein the positioning block and the second rotary shaft work together to limit the movement of the damping holder in the back and forth directions.

Further, an abutting part against which a first leg of a first torsion spring rests is riveted to the inner rocker, and a positioning ear for laterally stopping and limiting the movement of the first leg of the first torsion spring is formed on one side of the tail of the inner rocker close to the abutting part.

The beneficial effects of the utility model are: by adding a support unit, the damping holder and the adjusting unit are provided with a support force along the rotating axial direction of the adjusting unit, thus effectively mitigating the risk that the adjusting unit caves in and falls out, thereby ensuring that one can screw and adjust the adjusting unit properly with better reliability and stability.

Figure 1:
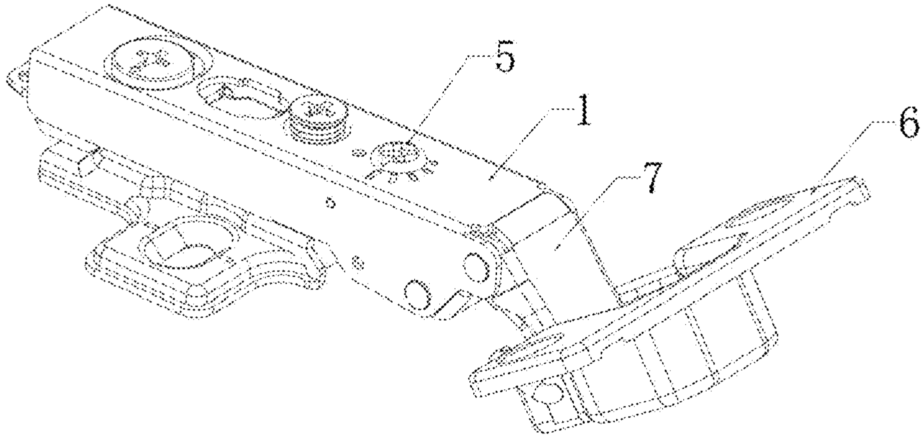
FIG. 1 is a schematic diagram that shows how to install a hinge according to an embodiment.

Among them, 1—hinge arm, 11—adjusting round hole, 12—positioning block, 13—first rotary shaft, 14—second rotary shaft, 15—support shaft, 2—damping assembly, 21—damping sleeve, 22—linear damper, 23—adjusting tab, 24—damping holder, 241—mounting slideway, 242—support groove, 3—inner rocker, 31—hook part, 32—abutting part, 33—positioning ear, 4—torsion spring, 5—adjusting unit, 51—eccentric part, 6—hinge cup, 7—outer rocker arm.

DESCRIPTION OF THE EMBODIMENTS

To better understand the present invention, the following makes an overall description of the present invention with reference to the appended drawings. Preferred embodiments of the invention are shown in the drawings. The invention may, however, be embodied in many different forms and should not be construed as limited to the embodiments set forth herein. These embodiments are provided to offer a thorough and overall comprehension of the disclosure of the utility model. It is noted that the terms "first" and "second" as used herein are used merely to distinguish one name from another, rather than denoting a particular amount or order.

Figure 2:
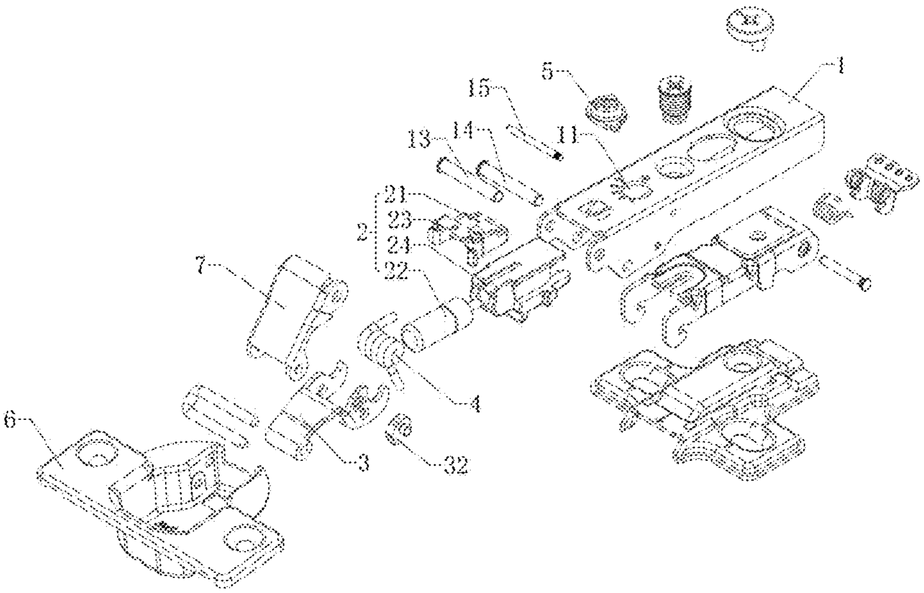
FIG. 2 is an exploded diagram of a hinge according to an embodiment.
Figure 3:
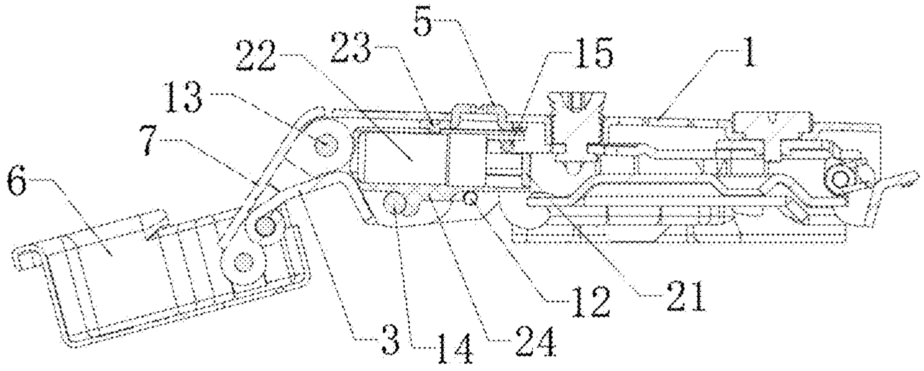
FIG. 3 is a cross sectional diagram of a hinge arm according to an embodiment.
Figure 4:
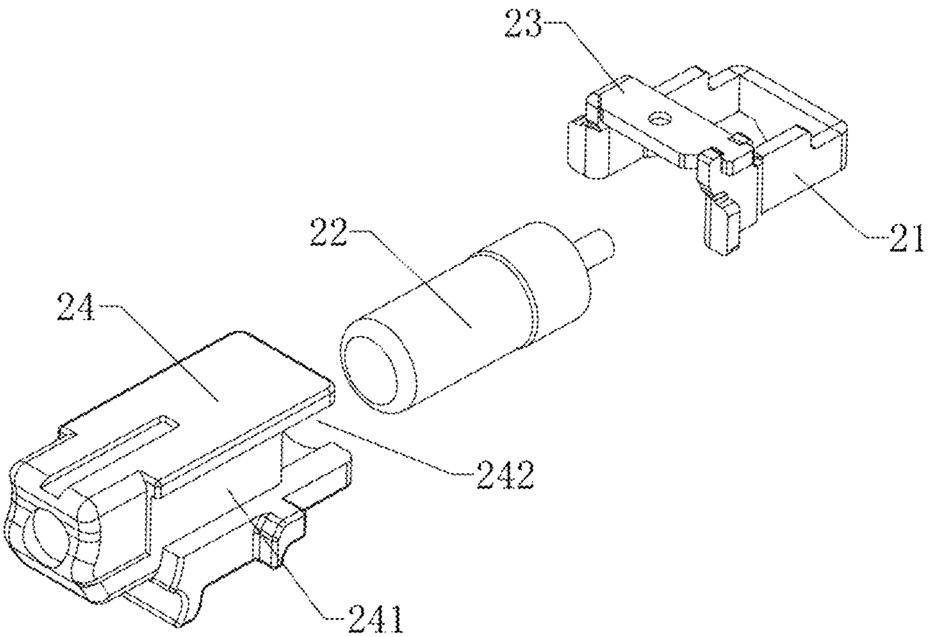
FIG. 4 is a schematic diagram of a damping assembly according to an embodiment.
Figure 5:
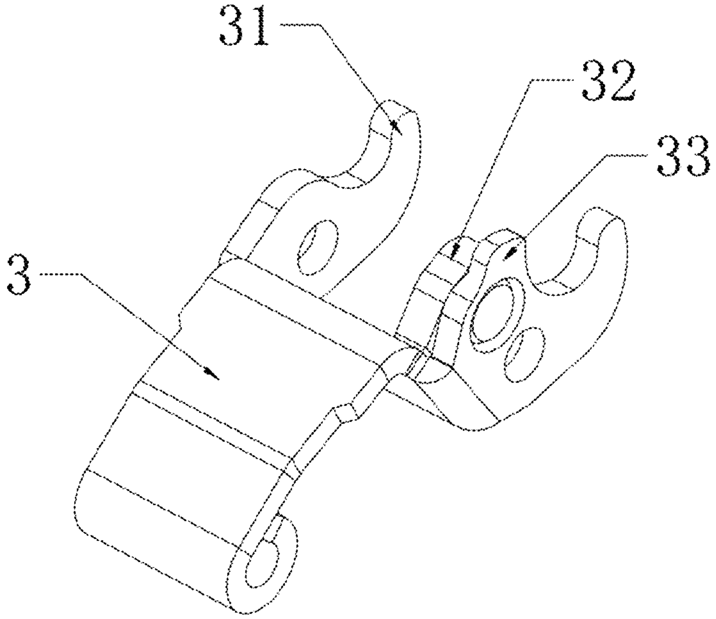
FIG. 5 is a schematic view of an inner rocker and a first abutting part according to an embodiment.
Figure 6:
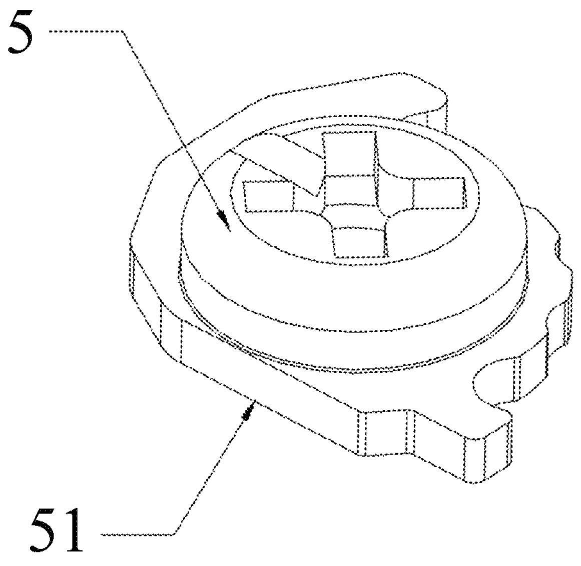
FIG. 6 is a schematic diagram of an adjusting unit according to an embodiment.

With reference to FIGS. 1-6, in this embodiment, a novel two-stage force hinge includes a hinge arm 1, a damping assembly 2, an adjusting unit 5 pivotally connected to the hinge arm 1 and used for changing the telescopic stroke of the damping assembly 2, an inner rocker 3 pivotally connected to the front end of the hinge arm 1 via a second rotary shaft 14, and a torsion spring 4 sheathed on a first rotary shaft 13 provided at the front end of the hinge arm 1, wherein the damping assembly 2 includes a damping holder 24, a damping sleeve 21 directionally and slidably connected to the damping holder 24, and a linear damper 22 that is set in the damping holder 24, specifically, the damping holder 24 is formed with an inner cavity for accommodating the cylinder of the linear damper 22, and the inner cavity of the damping holder 24 is formed with an opening extending to the front end thereof, so that the cylinder of the linear damper 22 is inserted into the inner cavity from the opening at the front end of the damping holder 24, so that the telescopic end of the linear damper 22 faces the damping sleeve 21. Secondly, the damping holder 24 is formed with a mounting slideway 241 for sliding connection with the damping sleeve 21, and specifically, the damping sleeve 21 in this embodiment has a U-shaped structure and the damping sleeve 21 performs a directional sliding action in the mounting slideway 241, and the telescopic end of the linear damper 22 is in a jacking contact with the tail of the inner cavity of the damping sleeve 21.

In this embodiment, both ends of the damping holder 24 are firstly fixed in the hinge arm 1, and specifically, two inner side walls of the hinge arm 1 are symmetrically formed with a positioning block 12 that is in a jacking contact with the front end of the damping holder 24. Secondly, the damping holder 24 also rests against the second rotary shaft 14, and works together with the positioning block 12 and the second rotary shaft 14 to resist and limit the movement of the damping holder 24 in the back and forth directions.

In this embodiment, an inner top wall of the hinge arm 1 is provided with an adjusting round hole 11 that extends upward therethrough, the upper end of the adjusting unit 5 is columnar and vertically extends through the adjusting round hole 11, leaving a portion of the adjusting unit exposed outside the top surface of the hinge arm 1, and at this moment, the exposed portion of the adjusting unit 5 serves as a screwing site. The lower end of the adjusting unit 5 is integrally formed with an eccentric part 51, wherein the contour of the eccentric part 51 is larger than that of the adjusting round hole 11, and the eccentric part 51 can rotate with the adjusting unit 5 around the axis of the adjusting round hole 11. Thus, the eccentric part 51 is rotated synchronously by screwing the adjusting unit 5, so that the outer contour of the eccentric part 51 stops against the tail surface of the adjusting tab 23, and thus the eccentric part 51 is rotated and switched to the outer contour of a different eccentric distance to contact with the adjusting tab 23, so as to change the sliding stroke of the damping sleeve 21 in the mounting slideway 241, thus changing the telescopic stroke of the damping assembly 2.

Further, an annularly arranged graduation line is provided at the top surface of the hinge arm 1 on the periphery of the adjusting round hole 11, and the graduation line is provided correspondingly to the stroke of the linear damper 22.

In this embodiment, an adjusting tab 23 is provided at the top surface of the damping sleeve 21 to stop against an eccentric part 51 preformed on the adjusting unit 5, wherein the adjusting tab 23 and the damping sleeve 21 may have an integrally formed or separately assembled structure, which is not specifically limited herein.

In this embodiment, the eccentric part 51 is located between the top surface of the damping sleeve 21 and the inner top wall of the hinge arm 1, which is actually: the bottom surface of the eccentric part 51 abuts against the damping holder 24, and the top surface of the eccentric part 51 abuts against the inner top wall of the hinge arm 1. Since the damping holder 24 is generally made of a plastic material selected, when screwing the adjusting unit 5, a user needs to press the screwdriver into the cross recess of the exposed end surface of the adjusting unit 5, and if the user at this moment poses a relatively large pressure, this may readily cause the adjusting unit 5 to sink and deform the damping holder 24, and the adjusting unit 5 cave in the adjusting round hole 11 and even fall out of the adjusting round hole 11 and into the hinge arm 1, turning the hinge into a junk. To solve this problem, the hinge arm 1 in this embodiment is provided with a support unit which is in a jacking fit with the damping holder 24, wherein the support unit is used to provide the damping holder 24 and the adjusting unit 5 with a support force along the rotating axial direction of the adjusting unit 5, and by using this upward support force generated by the support unit, the adjusting unit 5 is effectively prevented from sinking or falling out due to deformation of the damping holder 24.

Specifically, the support unit is a support shaft 15 fixed at both ends to the hinge arm 1, and the support shaft 15 extends through a support groove 242 preset on the damping holder 24, so that when the adjusting unit 5 presses the damping holder 24 downward, an upward support force is generated through mutual resistance between the support groove 242 and the support shaft 15.

In this embodiment, an opening of the inner cavity of the damping holder 24 extending to the front end thereof also serves as a support groove 242, wherein the damping sleeve 21 is formed with a step part at a position close to the opening of the damping holder 24 so as to avoid the support shaft 15, and with this structure design, the overall damping assembly 2 can be made more compact, further facilitating installation between the damping assembly 2 and the hinge arm 1.

Thus, with the support unit serving to limit the movement of the damping holder 24 and adjusting unit 5 in the height direction, and the positioning block 12 and the second rotary shaft 14 serving to limit the movement of the damping holder 24 in the back and forth directions, the damping holder 24 is stably mounted on the hinge arm 1.

In this embodiment, the tail of the inner rocker 3 is pivotally connected to the front end of the hinge arm 1 via the second rotary shaft 14, and two hook parts 31 are formed at the tail of the inner rocker 3 and respectively in an abutting fit with slide blocks preformed at the front ends of two side arms of the damping sleeve 21 (the front ends of the hook parts 31 can rest against the back of the slide blocks), thereby driving the damping sleeve 21 to move along the slideway towards the front end of the hinge arm 1. In addition, an aileron is also formed at the tail of the inner rocker 3, and an abutting part 32 against which a first leg of the torsion spring 4 rests is riveted to the aileron, wherein a positioning ear 33 for laterally stopping and limiting the movement of the first leg of the torsion spring 4 is formed on one side of the tail of the inner rocker 3 close to the abutting part 32, and the positioning ear 33 relatively protrudes above the periphery of the abutting part 32 and is used to laterally stop and limit the movement of the first leg of the torsion spring 4, preventing the first leg of the torsion spring 4 from deforming and falling out of the abutting part 32.

In this embodiment, also included are a hinge cup 6 and an outer rocker arm 7, wherein the front end of the outer rocker arm 7 and the front end of the inner rocker 3 are respectively pivotally connected to the hinge cup 6 via a rotary shaft, and the tail of the outer rocker arm 7 is pivotally connected to the front end of the hinge arm 1 via a first rotary shaft 13.

To better understand the two-stage force hinge described above, a further explanation is made below in connection with specific principles of operation.

Hinge close action: when the hinge cup 6 rotates towards a close direction, the torsion force of the torsion spring 4 is transmitted to the abutting part 32 via the first leg thereof, so as to drive the inner rocker 3 and the outer rocker arm 7 to respectively rotate around the second rotary shaft 14 and the first rotary shaft 13; at this moment, the hook part 31 comes into a jacking contact with the damping sleeve 21 and drives it to move towards the front direction of the hinge arm 1; in this process, using the damping holder 24 as a support, the telescopic rod of the linear damper 22 applies a damping and slowing effect to the damping sleeve 21, thereby serving to slow the rotation speed of the hinge cup 6; and at the same time, the damping sleeve 21 is decoupled from the eccentric part 51 of the adjusting unit 5. Finally, the hinge is fully closed, so that once mounted on the cabinet with door plates, the hinge can be slowly and gently closed without any slam.

Hinge open action: the hinge cup 6 rotates towards an open direction, the inner rocker 3 rotates around the second rotary shaft 14 in a direction away from the hinge arm 1, and the hook part 31 thereof swings accordingly in a direction away from the damping sleeve 21; at this moment, by using the damping holder 24 as a support, the telescopic end of the linear damper 22 comes into a jacking contact with the damping sleeve 21 and drive it to move towards the tail direction of the hinge arm 1, and the eccentric part 51 of the adjusting unit 5 is preset to stop against the adjusting tab 23, thereby serving to limit the sliding distance of the damping sleeve 21 and the stroke of the linear damper 22, and finally, the hinge cup 6 is fully opened.

The embodiments described above are merely preferred embodiments of the present invention and should not be construed as setting a limit in any form to the present invention. More possible changes, variations and modifications made, in view of the technical contents disclosed above and without departing from the scope of the technical solutions of the present invention, by those skilled in the art to the technical solutions of the present invention should be construed as equivalent embodiments of the present invention. Therefore, all equivalent changes made according to the concepts of the present invention and without departing from the content of the technical solutions of the present invention shall fall within the protection scope of the present invention.

What is claimed is:

1. A novel two-stage force hinge, comprising: a hinge arm, a damping assembly, an adjusting unit for changing a telescopic stroke of the damping assembly is pivotally connected to the hinge arm and can rotate relative to the hinge arm, and a hinge cup pivotally connected to the hinge arm, wherein the damping assembly comprises a damping holder, a damping sleeve directionally and slidably connected to the damping holder, and a linear damper that is set in the damping holder, a telescopic end of the linear damper faces the damping sleeve and the telescopic end is in a jacking contact with inner wall of a tail of an inner cavity of the damping sleeve; characterized in that: the hinge arm is provided with a support unit which is in a jacking fit with the damping holder, and the support unit is used to provide the damping holder and the adjusting unit with a support force along a rotating axial direction of the adjusting unit.

2. The novel two-stage force hinge as in claim 1, characterized in that: the support unit is a support shaft fixed at both ends to the hinge arm, and the support shaft extends through a support groove preset in the damping holder.

3. The novel two-stage force hinge as in claim 2, characterized in that: an opening of an inner cavity of the damping holder extending to the front end thereof also serves as the support groove, and the damping sleeve is formed with a step part at a position close to the opening of the damping holder so as to avoid the support shaft.

4. The novel two-stage force hinge as in claim 1, characterized in that: an adjusting tab is provided at the top surface of the damping sleeve to stop against an eccentric part preformed on the adjusting unit, wherein the adjusting unit is screwed so as to cause an outer contour of the eccentric part to stop against the adjusting tab at different positions, thereby changing the telescopic stroke of the damping assembly.

5. The novel two-stage force hinge as in claim 4, characterized in that: bottom surface of the eccentric part abuts against the damping holder.

6. The novel two-stage force hinge as in claim 1, characterized in that: further comprising an inner rocker pivotally connected to the front end of the hinge arm via a second rotary shaft, and a torsion spring sheathed on a first rotary shaft provided at the front end of the hinge arm.

7. The novel two-stage force hinge as in claim 6, characterized in that: two inner side walls of the hinge arm are symmetrically formed with a positioning block that is in a jacking contact with the front end of the damping holder, and the damping holder rests against the second rotary shaft, wherein the positioning block and the second rotary shaft work together to limit the movement of the damping holder in the back and forth directions.

8. The novel two-stage force hinge as in claim 6, characterized in that: an abutting part against which a first leg of the torsion spring rests is riveted to the inner rocker, and a positioning ear for laterally stopping and limiting the movement of the first leg of the torsion spring is formed on one side of the tail of the inner rocker close to the abutting part.

* * * * *